(12) United States Patent
Scott-Emuakpor et al.

(10) Patent No.: US 12,422,239 B1
(45) Date of Patent: Sep. 23, 2025

(54) MULTI-PIVOT AXLE DRIVETRAIN ALIGNMENT FIXTURE

(71) Applicant: Government of the United States, as represented by the Secretary of the Air Force, Wright-Patterson AFB, OH (US)

(72) Inventors: Onome Scott-Emuakpor, Beavercreek, OH (US); Bryan Langley, Springfield, OH (US); Tommy George, Germantown, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 381 days.

(21) Appl. No.: 18/141,482

(22) Filed: May 1, 2023

Related U.S. Application Data (60) Provisional application No. 63/339,543, filed on May 9, 2022.

(51) Int. Cl.
    *G01B 5/25* (2006.01)
    *G01B 5/00* (2006.01)

(52) U.S. Cl.
    CPC ............. *G01B 5/0025* (2013.01); *G01B 5/25* (2013.01)

(58) Field of Classification Search
    CPC ................................. G01B 5/25; G01B 5/0025
    USPC .................. 33/600, 606, 613, 645, 655, 412
    See application file for complete search history.

(56) References Cited

U.S. PATENT DOCUMENTS

| | | | | |
|---|---|---|---|---|
| 4,283,153 A * | 8/1981 | Brendamour | ......... | B23P 19/102 403/53 |
| 4,290,203 A * | 9/1981 | Rebman | ................ | B23P 19/102 33/645 |
| 4,549,359 A * | 10/1985 | Hense | .................. | G01B 5/0025 33/600 |
| 4,586,264 A * | 5/1986 | Zatezalo | .................. | G01B 5/24 33/645 |
| 5,396,714 A * | 3/1995 | Sturges, Jr. | .............. | G01B 5/25 901/45 |
| 7,886,449 B2 * | 2/2011 | Kosmowski | .......... | F16C 29/025 33/286 |
| 7,975,397 B2 * | 7/2011 | Meyer | .................... | G01B 21/22 33/787 |
| 8,016,277 B2 * | 9/2011 | Choi | ...................... | B82Y 40/00 269/58 |
| 8,056,251 B1 * | 11/2011 | Oglesby | .................... | E21B 7/04 33/645 |

(Continued)

*Primary Examiner* — George B Bennett
(74) *Attorney, Agent, or Firm* — AFMCLO/JAZ; Matthew D. Fair (57) ABSTRACT

An alignment test fixture for a multi-pivot shaft includes a first flexure plate and a second flexure plate spaced apart from one another. A plurality of flexure arms extend outward from a central region of the first and second flexure plates. A central through aperture is formed in the central region of the first and second flexure plate. A plurality of spacers positioned between the first and second flexure plates and a plurality of legs connected to the arms of the first and second flexure plates. The flexure plates can be positioned so as to support a misaligned shaft extending through the central apertures thereof when the shaft is axially displaced and/or angularly misalignment relative to an axial direction.

20 Claims, 12 Drawing Sheets

(56) References Cited

U.S. PATENT DOCUMENTS

| | | | | |
|---|---|---|---|---|
| 8,347,514 | B1* | 1/2013 | McCollum | E02D 27/42 |
| | | | | 33/1 G |
| 8,533,965 | B2* | 9/2013 | Stromberg | G01B 11/27 |
| | | | | 33/412 |
| 8,973,278 | B2* | 3/2015 | Ham | G01B 5/24 |
| | | | | 33/549 |
| 9,791,070 | B2* | 10/2017 | Fraysse | B64D 37/00 |
| 10,358,029 | B2 | 7/2019 | Gruschow et al. | |
| 2001/0018804 | A1* | 9/2001 | Won | B23P 19/12 |
| | | | | 901/45 |
| 2009/0302567 | A1 | 12/2009 | Gregg | |
| 2021/0389112 | A1* | 12/2021 | Hung | G01B 5/25 |
| 2024/0344817 | A1* | 10/2024 | Humbert | G01B 5/25 |

\* cited by examiner

MULTI-PIVOT AXLE DRIVETRAIN ALIGNMENT FIXTURE

Pursuant to 37 C.F.R. § 1.78 (a)(4), this application claims the benefit of and priority to prior filed Provisional Application Ser. No. 63/339,543, filed May 9, 2022, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a test alignment fixture configured to maintain alignment of multi-pivot axles, shafts and linear drivetrain system that operate under longitudinal and/or torsional dynamic motion.

BACKGROUND

Manufacturers of commercial alignment fixtures do not provide a solution for maintaining alignment integrity of linear systems that experience aggressive torsional loads because most alignment fixtures are in-line (or part of the drivetrain) of the linear system. Prior art systems do not have the ability to isolate the alignment system from the linear drivetrain, thus cannot sustain alignment over long durations of high magnitude dynamic torque and axial motion within the drivetrain. For these and other reasons, existing systems have various shortcomings, drawbacks, and disadvantages relative to certain applications. Accordingly, there remains a need for further contributions in this area of technology.

SUMMARY

One embodiment of the present disclosure includes a unique test alignment fixture configured to maintain alignment of multi-pivot axles, shafts and linear drivetrain systems that operate under longitudinal loading and/or torsional dynamic motion. Other embodiments include apparatuses, systems, devices, hardware, methods, and combinations wherein the alignment fixture isolates the alignment system from the linear drivetrain to sustain alignment over long durations of high magnitude dynamic torque and axial motion within the drivetrain. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure is directed to a multi-pivot fixture capable of maintaining axial centerline position between two end points. The fixture maintains alignment of any axle, shaft, or linear drivetrain system that experiences longitudinal and/or torsional dynamic motions critical to operation. Linear drivetrain systems can include, but are not limited to, transportation/recreational vehicle axles, heavy machining tools, electrical power systems, and combustion engine shafts. The fixture includes a plurality of pivot points for layered components that controls position and pitch of the aligned drivetrain. With this design, there is minimal applied pressure on the axle and a negligible effect on operational torque while maintaining centerline position. Misalignment of a linear drivetrain system is determined by position and pitch with respect to the centerline of the drivetrain system. The alignment fixture can maintain axial alignment within the initially calibrated specification even under aggressive axial and rotational loads over millions of dynamic cycles.

Figure 1A:
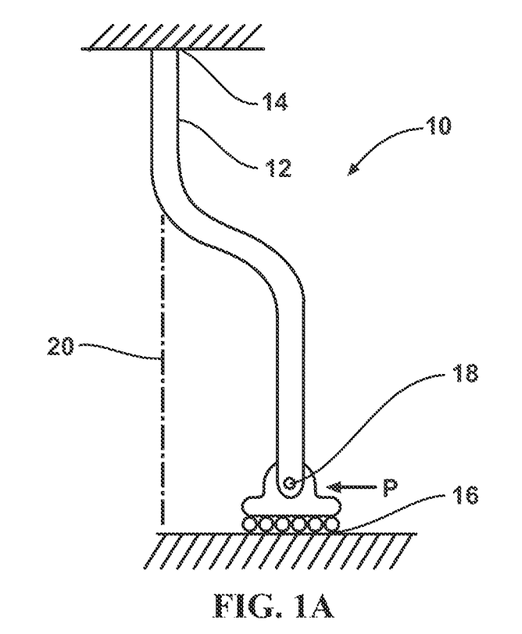
FIGS. 1A and 1B are illustrative schematic views of a linear drive system 10.
Figure 1B:
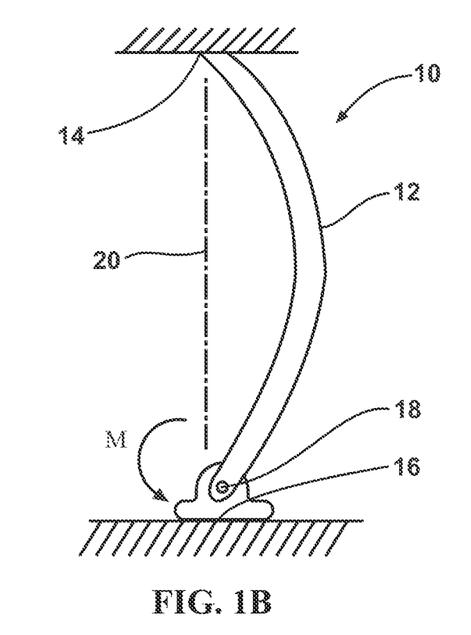

FIGS. 1A and 1B are illustrative schematic views of a linear drive system 10 represented by a beam or shaft 12 fixed at a first end 14 and axially free at a second end 16 (FIG. 1A) and pivotably attached at a second end 16 with a pin mechanism 18 (FIG. 1B). FIG. 1A shows an axial displacement of a shaft 12 at the second end 16 due to a force P. FIG. 1B shows a pitch or angular displacement of the shaft 12 at the second end 16 due to a moment M. The longitudinal axis 20 defines the locations of the first and second ends 14, 16 when the beam extends in a linear alignment. A force P and/or a moment M may be applied to the drive train system 10 to maintain the positions of the first and second ends 14, 16 of the beam 12. The beam position is retained by P force (i.e. the two ends are on centerline), the pitch retaining moment M increases until the angle of deflection from centerline is zero as well. The disclosed system isolates the alignment system from the linear drivetrain, thus sustain alignment over long durations of high magnitude dynamic torque and axial motion within the drivetrain. The isolation of the alignment system from the axle of the drivetrain occurs by fixing the pivot point of the position and pitch retaining components to a surface normal to the drivetrain centerline. The present disclosure is directed to an alignment fixture used in precision testing of a shaft having at least one pivot point where even a slight misalignment in an angular orientation or displacement from a linear vertical orientation is not acceptable.

Figure 2:
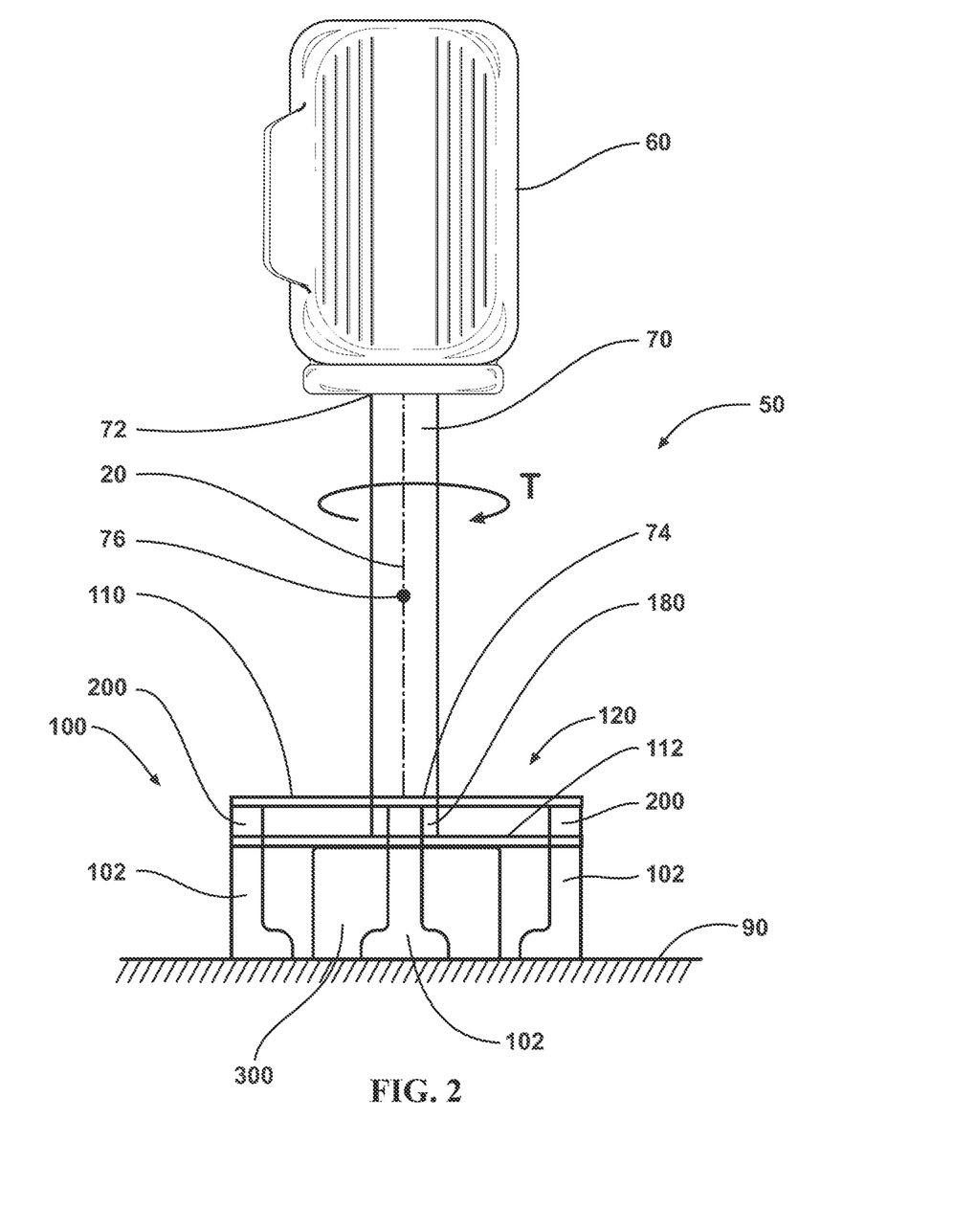
FIG. 2 is a schematic view of a shaft testing apparatus with an alignment fixture according to one embodiment of the present disclosure.

FIG. 2 is a schematic view of a shaft testing apparatus 50 according to one embodiment of the present disclosure. The apparatus 50 includes an electric drive motor 60 coupled to a shaft 70 extending between a first end 72 and a second end 74. One or more pivot joints 76 can be operational anywhere along the shaft 70 including at either of the first and second ends 72, 74 respectively. The drive motor applies a rotational torque T and/or an axial load to the shaft 70. A bearing housing 300 positioned on a support surface 90 is operable for rotatably supporting the shaft 70. An alignment fixture 100 is configured to control position of the shaft 70 when it is angularly or axially misaligned from the longitudinal axis 20 due to operational loading or physical construction. The alignment fixture 100 can include a plurality of support legs 102 that extend from the support platform 90 to hold a first flexure plate 110 and a second flexure plate in a desired position. The number of support legs 102 can be of any number suitable for the type of drivetrain being tested. Typically, the testing apparatus 50 includes 3 or more legs 102 and in the disclosed embodiment includes four legs 102. The legs 102 can be formed in various shapes including a T-shape as illustrated in the disclosed embodiment. The flexure plates 110, 112 are spaced apart from one another with a central flexure spacer 180 and a plurality of arm spacers 200. The assembly and construction of the alignment fixture 100 will be described in more detail below.

Figure 3:
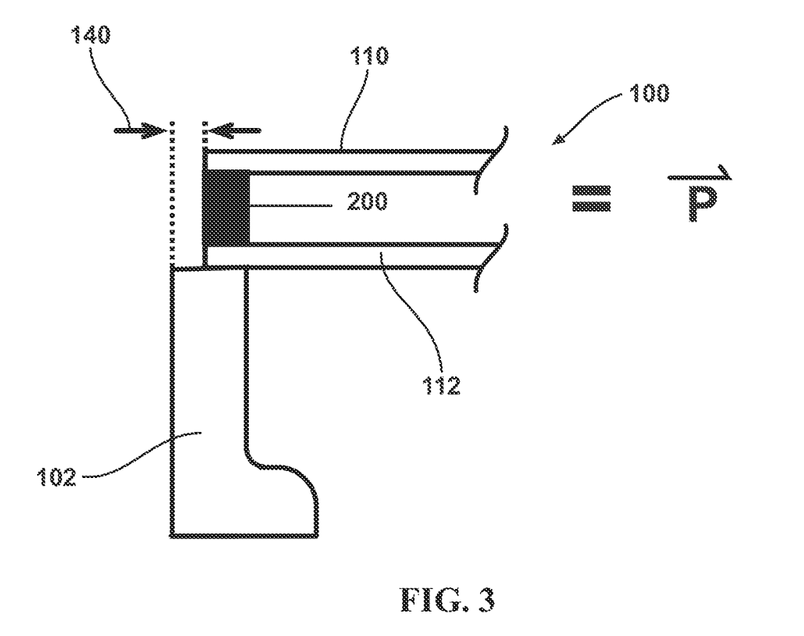
FIG. 3 is a schematic cross sectional view of a portion of the alignment fixture showing pivot points under a force load during operation.
Figure 4:
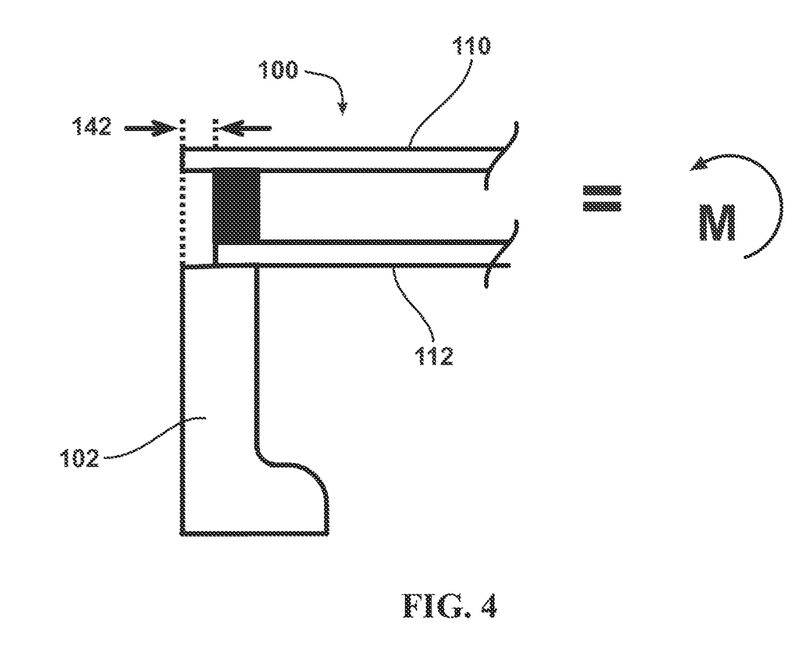
FIG. 4 is a schematic cross sectional view of a portion of the alignment fixture showing pivot points under a moment load during operation.

FIGS. 3 and 4 schematically illustrate how the alignment fixture 100 can be modified to support a shaft 70 when the shaft is axially displaced by a distance 140 or angularly displaced by a moment displacement 142. For axial only displacement of the shaft 70, both the first and second flexure plates 110, 112 are moved together to a displaced location. When the pitch or angular displacement of the shaft 70 is not aligned with the axial direction, the first and second flexure plates 110, 112 are moved independently to different locations to account for the orientation angle. The flexure plates 110, 112 operate to prevent the shaft 70 from moving in a lateral direction while providing flexibility to permit some movement of the shaft 70 and portions of the testing apparatus 50 in an axial direction during operation.

Figure 5:
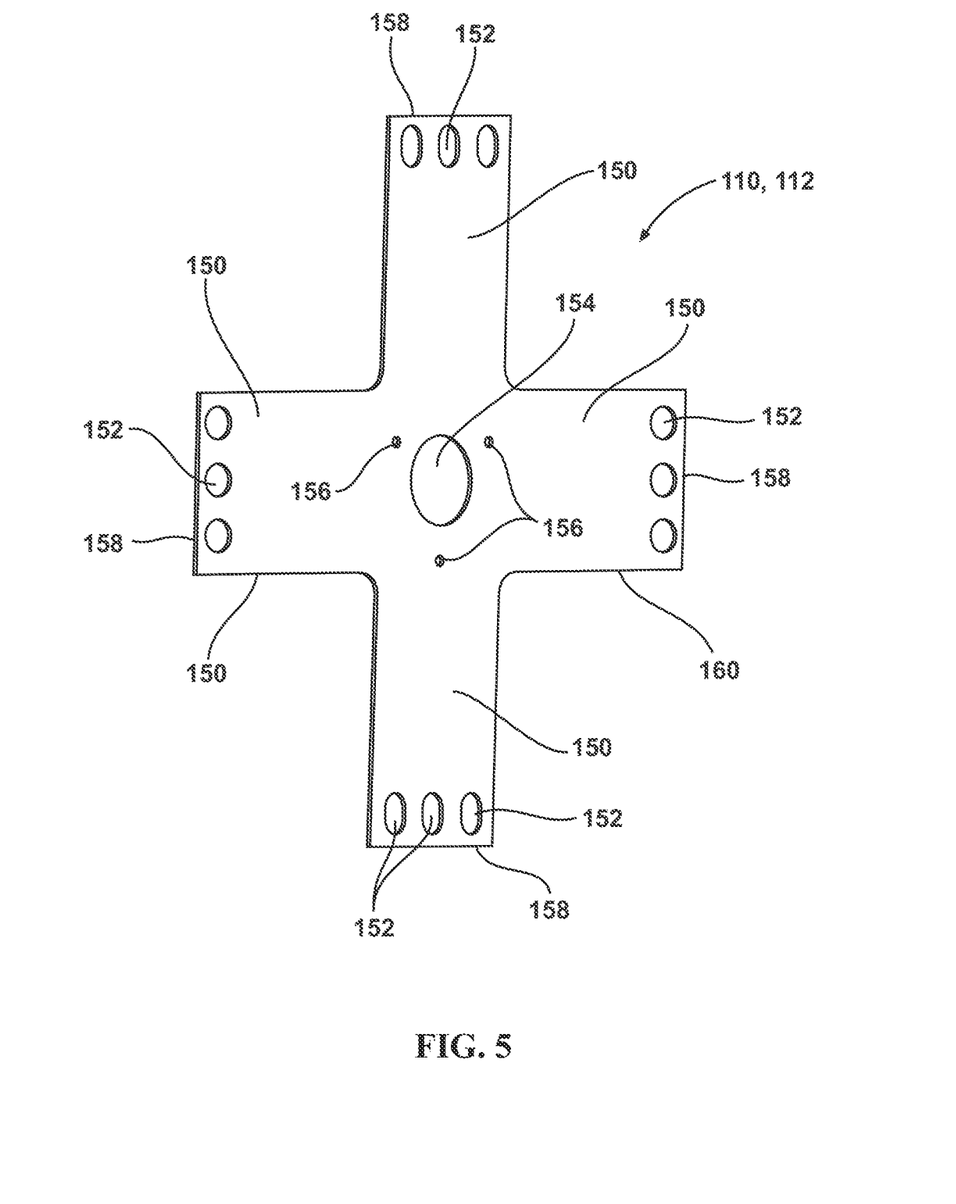
FIG. 5 is a plan view of a flexure plate according to one embodiment of the present disclosure.

Referring now to FIG. 5, a perspective view of a flexure plate 110, 112 is depicted therein. The flexure plate 110, 112 includes a plurality of arms 150 extending outward from a central aperture 154. The number of arms 150 can vary from, by way of example and not limitation, two to ten or greater for different applications, however in the disclosed embodiment there are four arms 150. Each arm 150 includes at least one ovalized connecting slot 152 to permit adjustment of the location of the flexure plate 110, 112 to match the position of the shaft.

The central aperture 154 is formed at the approximate center of the flexure plate 110, 112 and is sized to receive a shaft that is positioned therethrough. In one form, the central aperture 154 of the flexure plates 110, 112 is sized line to line with the diameter of the shaft 70 so that as the shaft rotates there will be a slight 360 degree engagement between the flexure plates 110, 112 and the shaft 70. In other forms, the central aperture 154 of the flexure plates 110, 112 is sized to be larger than the diameter of the shaft 70 so that as the shaft rotates there will be no engagement or possibly only intermittent contact with the flexure plates 110, 112.

A plurality of adaptor connecting holes 156 are positioned around the central aperture 154. The arms 150 can be rectangular in shape as shown, however the invention is not limited any particular shape. The arms 150 extend outward from the central aperture 154 to a distal end 158. The one or more ovalized slots 152 are formed proximate the distal end 158 of the arms 150. The flexure plates 110, 112 have a thin wall thickness 160 as compared to the length of the arms 150. The thin wall 160 permits the flexure plates 110, 112 to flex and bend under axial loading of the testing apparatus 50. The shape of the flexure plates 110, 112 provide for a relatively stiff structure in lateral directions normal to the centerline axis 20 of the testing apparatus 50.

Figure 6:
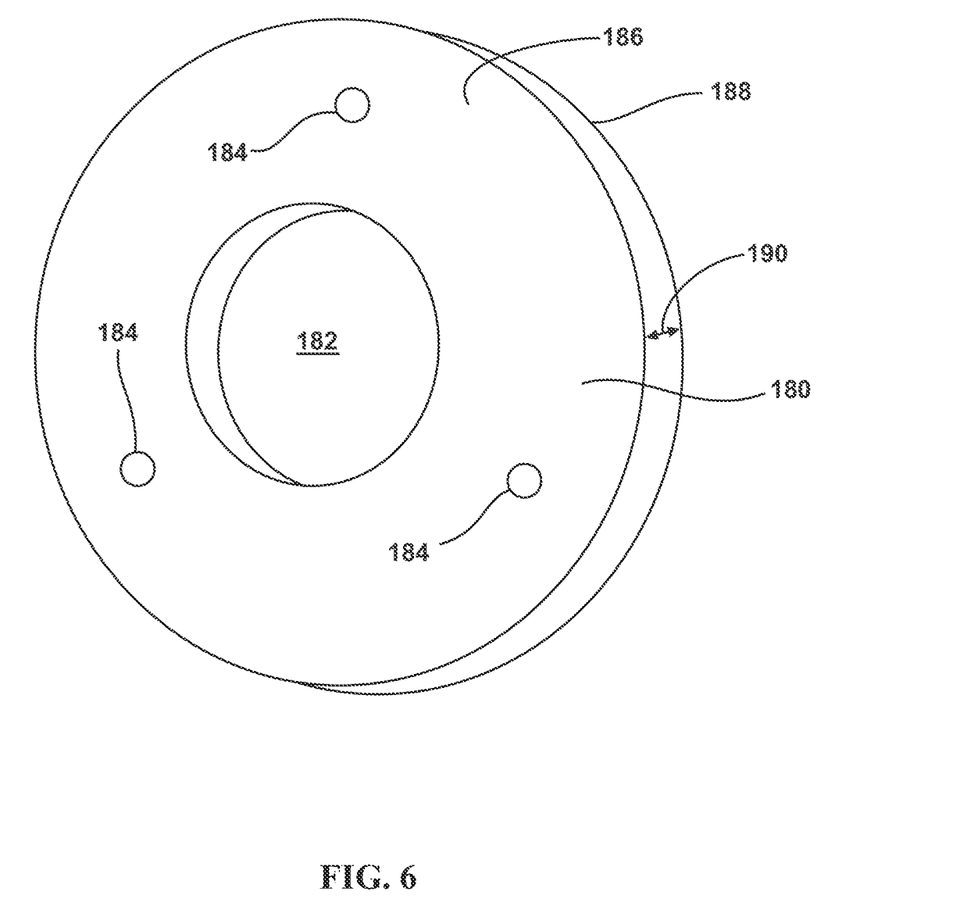
FIG. 6 is a perspective view of a central flexure spacer.

Referring now to FIG. 6, a perspective view of a central flexure spacer 180 is illustrated. The central flexure spacer 180 is positioned between the pair of flexure plates 110, 112 proximate the central aperture 154. In some embodiments a central flexure spacer 180 can be connected to the underside of the upper or first flexure plate 110 and to the upper side of the lower or second flexure plate 112 to provide additional structure to attach portions of the test apparatus 50 thereto. In the disclosed embodiment, the central flexure spacer 180 is shown as a circular disk, however other shapes can be used and are contemplated by the present disclosure. A central aperture 182 is formed through the approximate center of the central flexure spacer 180. The central aperture 182 of the central flexure spacer 180 is substantially aligned with the central aperture 154 of the flexure plates 110, 112 when assembled together. In one form the diameter size of the central apertures 154 of the flexure plates 110, 112 and 182 of the central flexure space 180 are substantially similar, however in other embodiments the size of the central aperture 182 of the central flexure spacer 180 can be larger than the central aperture 154 of the flexure plates 110, 112. In the case where the flexure plates 110, 112 are offset due to angular misalignment of the shaft 70, a larger diameter central flexure spacer 180 can be used so as not to interfere or otherwise contact the shaft 70. A plurality of adapter holes 184 can be formed through the central flexure spacer 180 from a top wall 186 to a bottom wall 188 thereof to permit threaded fasteners (not shown) to pass therethrough and connect various structure together in the alignment fixture 100. A spacer thickness 190 is defined by the distance between the top wall 186 and the bottom wall 188 of the central flexure spacer 180. The spacer thickness 190 can vary is defined by requirements for testing of different types of shafts 70 on the test apparatus 50.

Figure 7:
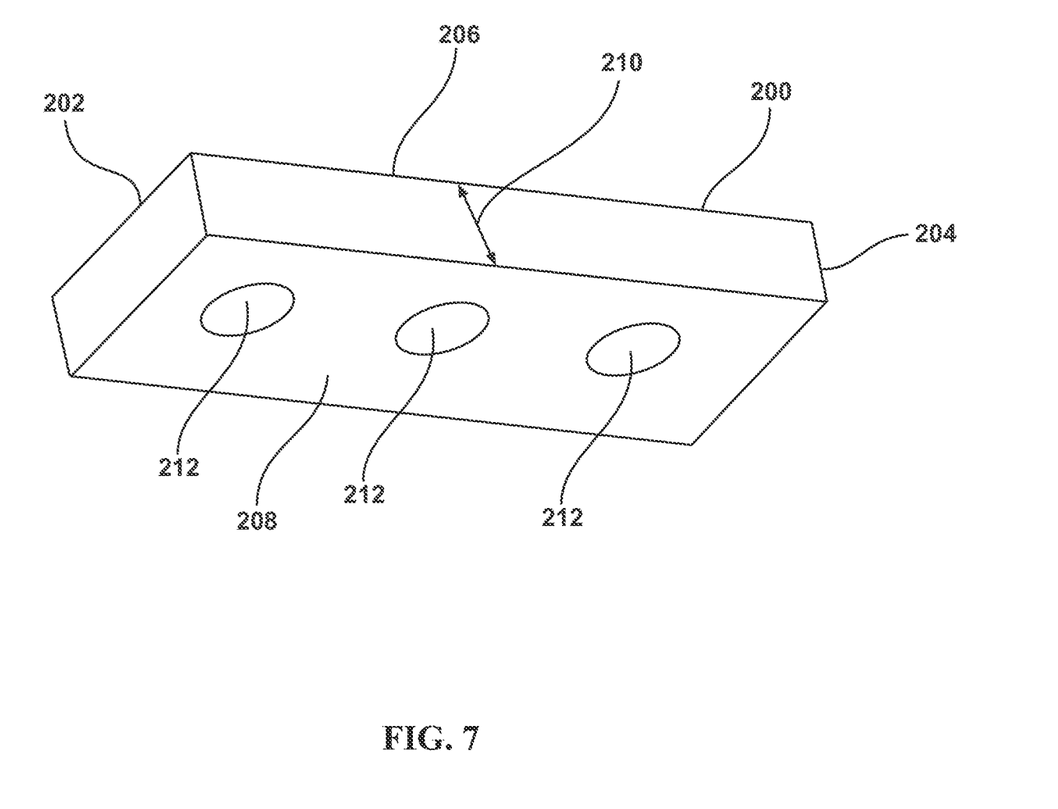
FIG. 7 is a perspective view of a flexure arm spacer.

FIG. 7 shows a perspective view of an arm spacer 200. The arm spacer 200 is positioned between the arms 150 of the flexure plates 110, 112 proximate the distal ends 158 thereof. In some embodiments arm spacers 200 can be connected to the underside of the arms 150 of the first flexure plate 110 and to the upper side of the arms 150 of the second flexure plate 112 to provide additional structure to attach portions of the test apparatus 50 thereto. In the disclosed embodiment, the arm spacer 200 is shown as a rectangular structure, however other shapes can be used and are contemplated by the present disclosure. The arm spacer 200 extends between a first end 202 and a second end 204 approximately the same length as a width of the arms 150 of the flexure plates 110, 112. A plurality of arm alignment holes 212 are formed through a thickness 210 of the arm spacer 200 defined between a top wall 206 and a bottom wall 208 thereof. The thickness 210 of the arm spacer 200 can vary for the same reasons as discussed relative to the central flexure spacer 180 above. The alignment holes 212 of the arm spacer 200 are substantially aligned with the ovalized connecting slots 152 of the arms 150 of the flexure plates 110, 112 when assembled together. In the case where the flexure plates 110, 112 are offset due to angular misalignment of the shaft 70, the ovalized slots 152 provide enough tolerance for the fasteners (not shown) to extend through the arm spacers 200 and the offset flexure plates 110, 112 and then lock the flexure plates 110, 112 in a desired location for testing of a shaft 70. In some forms the alignment holes 212 may be enlarged or ovalized relative to the connecting slots 152.

Figure 8:
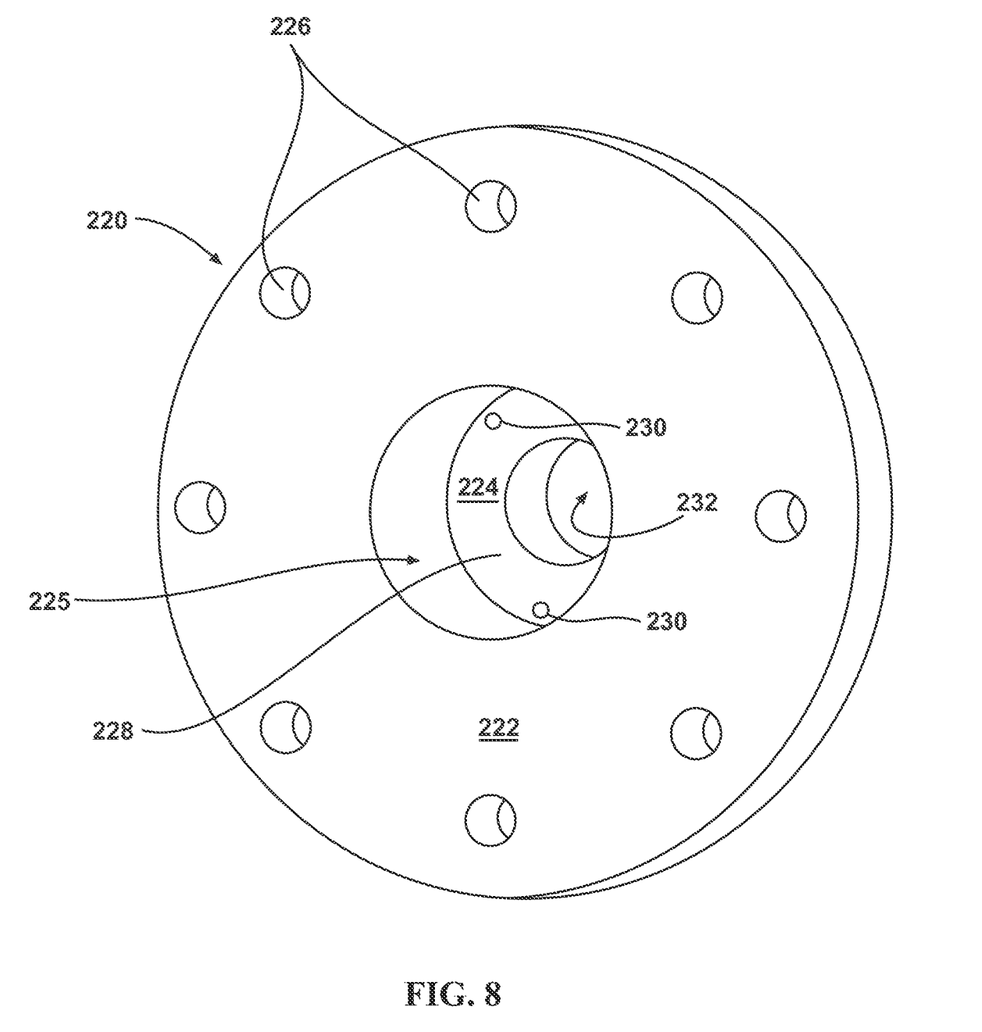
FIG. 8 is a perspective view of a top adaptor for the alignment fixture.

FIG. 8 is a perspective view of a top adaptor 220 for the alignment fixture 100. The top adaptor 220 is defined by an outer plate 222 having an inner drum 224 protruding away from the center thereof. An internal circular pocket 225 is formed between the outer plate 222 and the drum 224. A plurality of grip connector holes 226 are formed around a perimeter 228 of the outer plate. The grip connector holes 226 are sized to receive threaded fasteners (not shown) to connect the alignment fixture 100 to other portions of the testing apparatus 50. The inner drum 224 includes a flat face 228 with a plurality of flexure plate connector holes 230 formed therethrough. The flexure plate connector holes 230 are sized to receive fasteners extending therethrough to connect to the flexure plates 110, 112 and the central flexure spacer 180 of the alignment fixture 100. A central aperture 232 is formed through the inner drum 224 so that the shaft 70 may be positioned therethrough.

Figure 9:
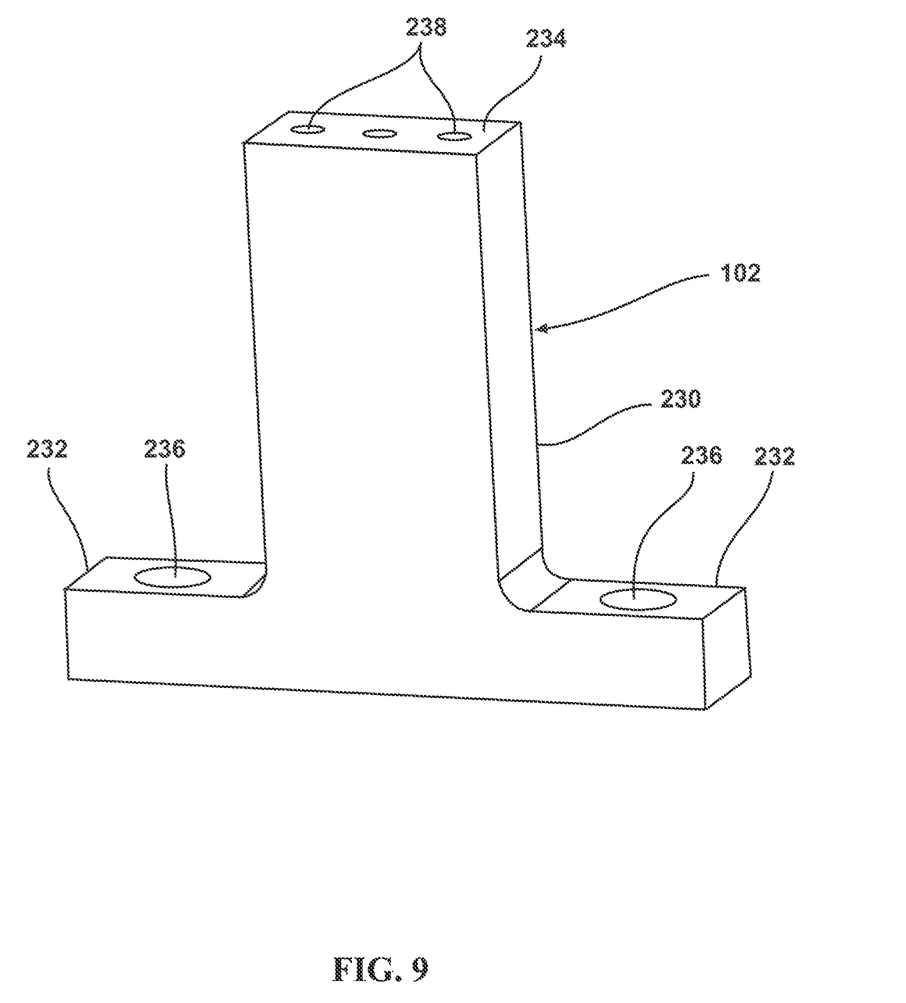
FIG. 9 is a perspective view of a support leg for the alignment fixture.

FIG. 9 is a perspective view of an exemplary support leg 102 for the alignment fixture 100. In the disclosed embodiment the support leg 102 is T-shaped defined by a vertical extension 230 projecting from a base or foot 232 to a top wall 234 thereof. At least one platform hole 236 is located in base 232 to attach the support leg 102 to a platform (not shown). The top wall 234 of the support leg 102 includes at least one internal threaded aperture 238 to receive a threaded fastener (not shown) to connect the arms 150 of the flexure plates 110, 112 and the arm spacers 200 to the support leg(s) 102. In the disclosed embodiment three fasteners are used to connect the arms 150, however other embodiments may require a different number of fasteners.

Figure 10:
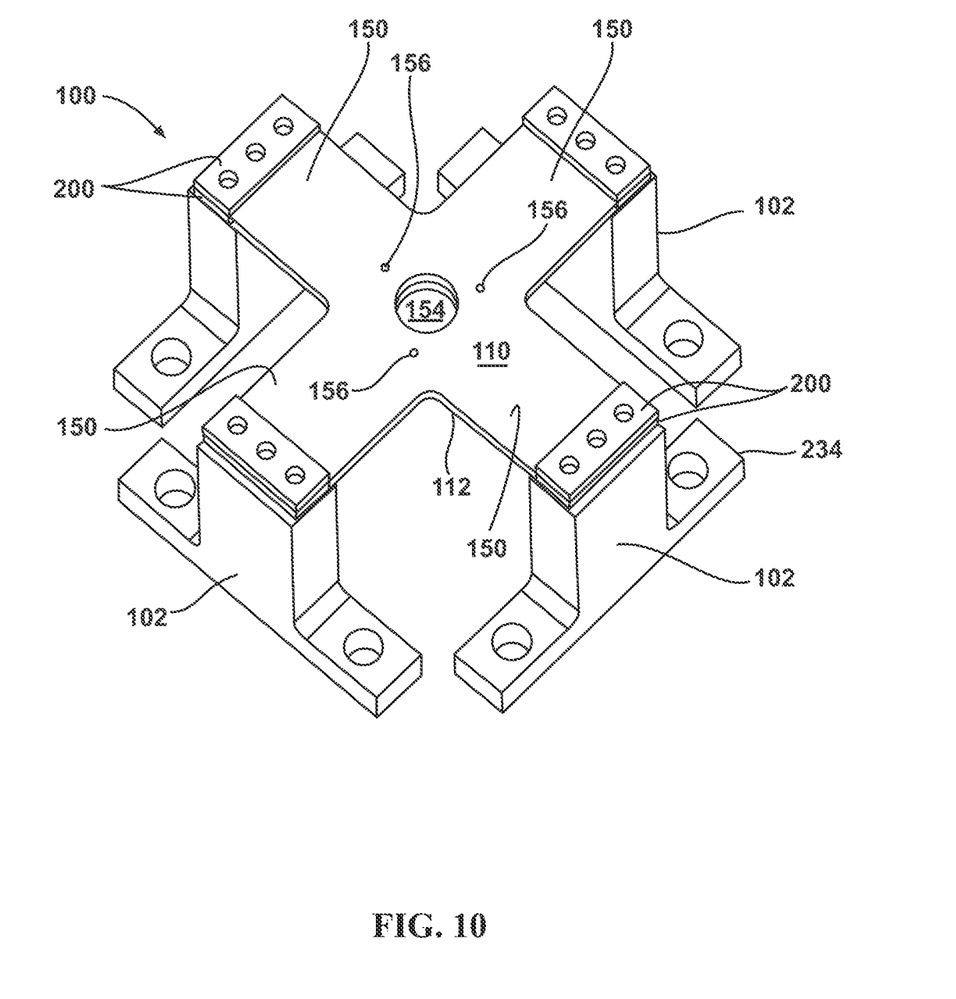
FIG. 10 is a top perspective view of a portion of the alignment fixture.
Figure 11:
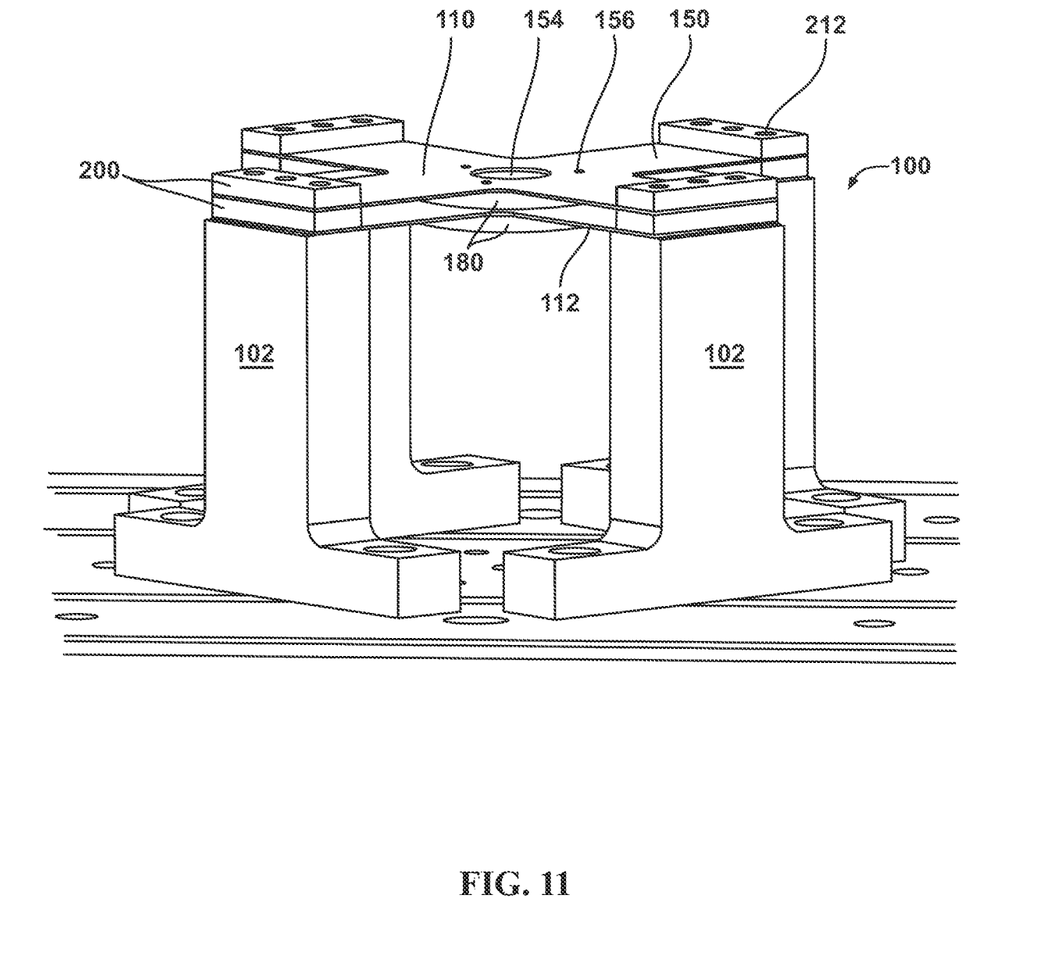
FIG. 11 is a side perspective view of the alignment fixture of FIG. 10.
Figure 12:
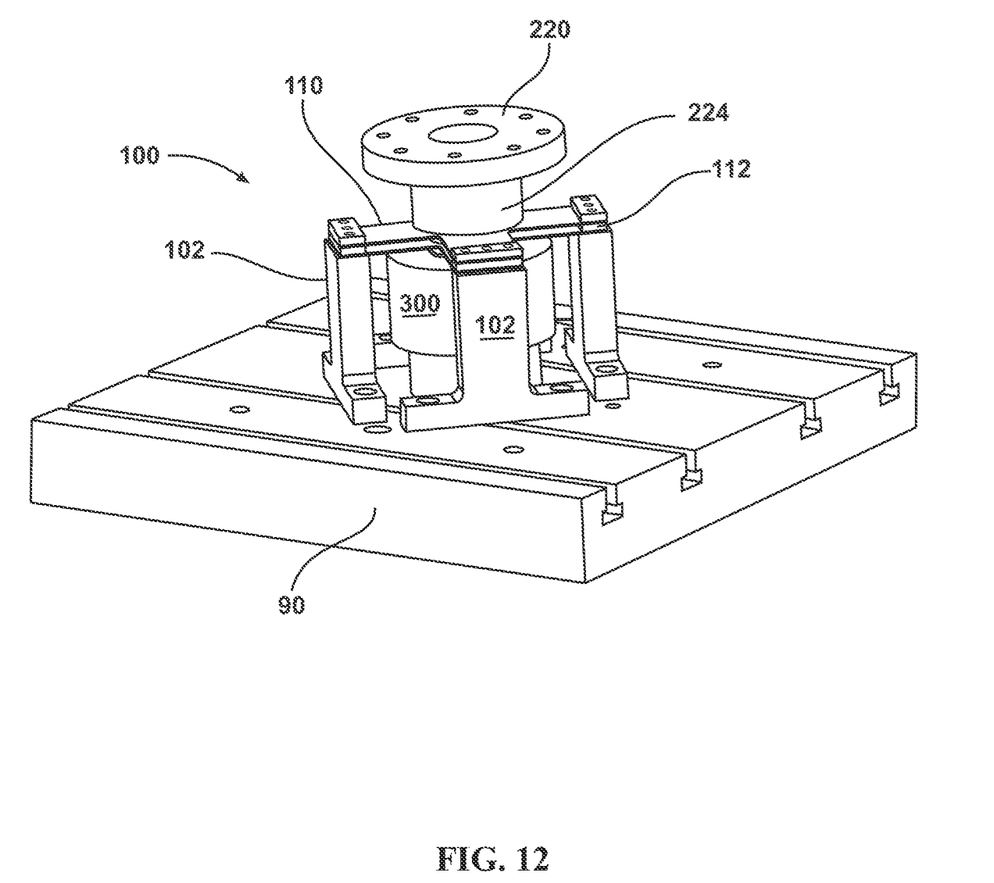
FIG. 12 is a perspective view of a portion of a shaft alignment system assembly.
Figure 13:
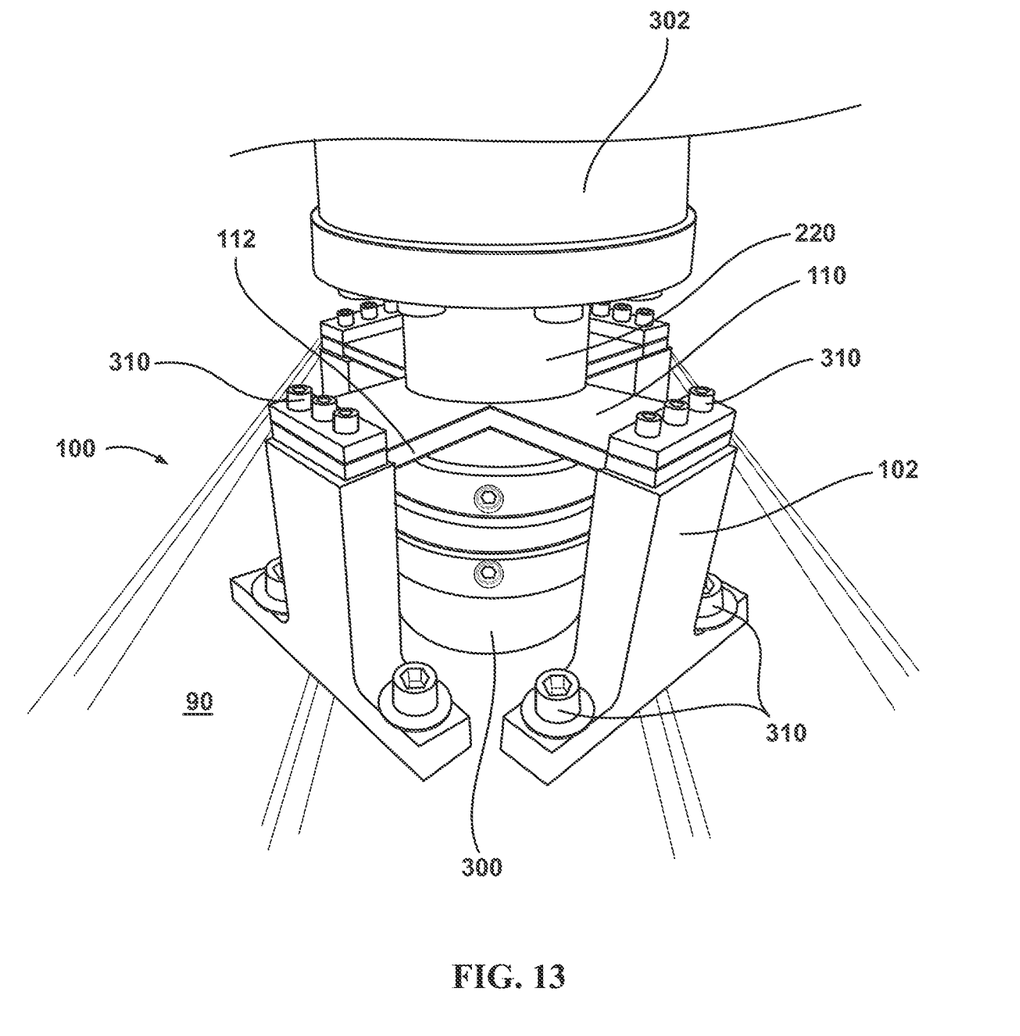
FIG. 13 is another perspective view of the shaft alignment system assembly.

FIGS. 10 and 11 show a top perspective view and a side perspective view of the alignment fixture 100, respectively. The alignment fixture 100 includes first and second flexure plates 110, 112 connected to four support legs 102. As discussed previously the number of support legs 102 will correspond with the number of arms 150 of the flexure plates 110, 112. The number of arms 150 and support legs 102 can vary between 2 at a lower end to six or more at the upper end. FIG. 12 is a perspective view of a portion of a shaft alignment system shown in FIGS. 10 and 11 with the top adaptor 220 connected to the alignment fixture 100. FIG. 13 is another perspective view of shaft alignment fixture 100 with a bearing system 300 attached to the underside of the flexure plates 110, 112 and force transducer 302 connected to the top adaptor 220 above the flexure plates 110, 112. A plurality of threaded fasteners 310 are used to connect various components of the testing apparatus 50 together and to attach the alignment fixture 100 to the support surface or platform 90.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An alignment test fixture for a multi-pivot shaft comprising:
   a first flexure plate and a second flexure plate spaced apart from one another;
   a plurality of flexure arms extending outward from a central region of each of the first and second flexure plates;
   a central through aperture formed in the central region of the first and second flexure plates;
   an axial direction defined by an imaginary line extending vertically through a center of the central through apertures;
   a lateral direction defined by any imaginary line extending orthogonally from the axial direction;
   a plurality of spacers positioned between the first and second flexure plates; and
   a plurality of legs connected to the arms of the first and second flexure plates.

2. The fixture of claim 1, wherein the plurality of arms include four arms positioned substantially orthogonally relative to one another.

3. The fixture of claim 1, further comprising at least one ovalized aperture positioned proximate a distal end of each of the arms of the first and second flexure plates.

4. The fixture of claim 1, wherein each of the flexure plates are formed at a thickness that permits flexible bending in the axial direction.

5. The fixture of claim 1, wherein the flexure plates are stiff and unflexible in lateral directions.

6. The fixture of claim 1, wherein the central apertures of the flexure plates are axially aligned when a shaft system is aligned in an axial direction in the test fixture.

7. The fixture of claim 1, wherein the central apertures of the flexure plates are offset in the axial direction when a shaft system is misaligned at an angle relative to the axial direction in the test fixture.

8. The fixture of claim 1, wherein the first flexure plate is connected directly to each of the legs.

9. The fixture of claim 1, further comprising at least one treaded fastener extending through the first and second flexure plates being threadingly engaged with each leg.

10. The fixture of claim 1, wherein the plurality of spacers include end spacers positioned between the flexure plates at distal ends of the arms and a central spacer positioned between the central region of the flexure plates.

11. The fixture of claim 1, wherein the central spacer includes a central through aperture.

12. The fixture of claim 1, wherein the central spacer includes a plurality of connecting holes formed around the central aperture.

13. The fixture of claim 1, further comprising a plurality of threaded fasteners connecting the first and second flexure plates through the connecting holes in the central spacer.

14. A testing system for a multi-pivot shaft comprising:
an electric actuator operably for transmitting an axial and/or a torsional load to a shaft assembly extending between first and second ends;
an alignment fixture configured to receive and engage with the second end of the shaft assembly;
an axial direction defined by an imaginary straight axial line extending from the electric actuator and a center of the alignment fixture;
a flexure plate assembly forming a portion of the alignment fixture configured to permit testing of the shaft assembly when misaligned relative to the axial line in the axial direction;
a first flexure plate having a central aperture and a second flexure plate having a central aperture spaced apart from one another as part of the flexure plate assembly;
wherein the central apertures of the first and second flexure plates are moveable relative to the axial line and relative to one another.

15. The shaft testing system of claim 14, wherein the shaft assembly extends through the central apertures of the flexure plates.

16. The shaft testing system of claim 15 wherein the first and second flexure plates are repositionable to match displacement variation and/or angular variation of the shaft relative to the axial line.

17. The shaft testing system of claim 14, further comprising a plurality of spacers connected between the first and second flexure plates.

18. The shaft testing system of claim 14, further comprising an adaptor coupled to the flexure plates.

19. The shaft testing system of claim 18 further comprising a force transducer connected to the adaptor and operable for measuring the a torque and/or an axial force transmitted by the actuator to the shaft assembly.

20. A method for testing a multi-pivot shaft assembly comprising:
preventing axial shaft drivetrains from torque or combined loading misalignment by permitting angular and axial position variation while restricting motion normal to an axial direction; and
wherein the preventing includes using an alignment fixture with a pair of flexure plates that are relatively flexible in the axial direction and relatively stiff in lateral directions normal the axial direction.

* * * * *